UNITED STATES PATENT OFFICE.

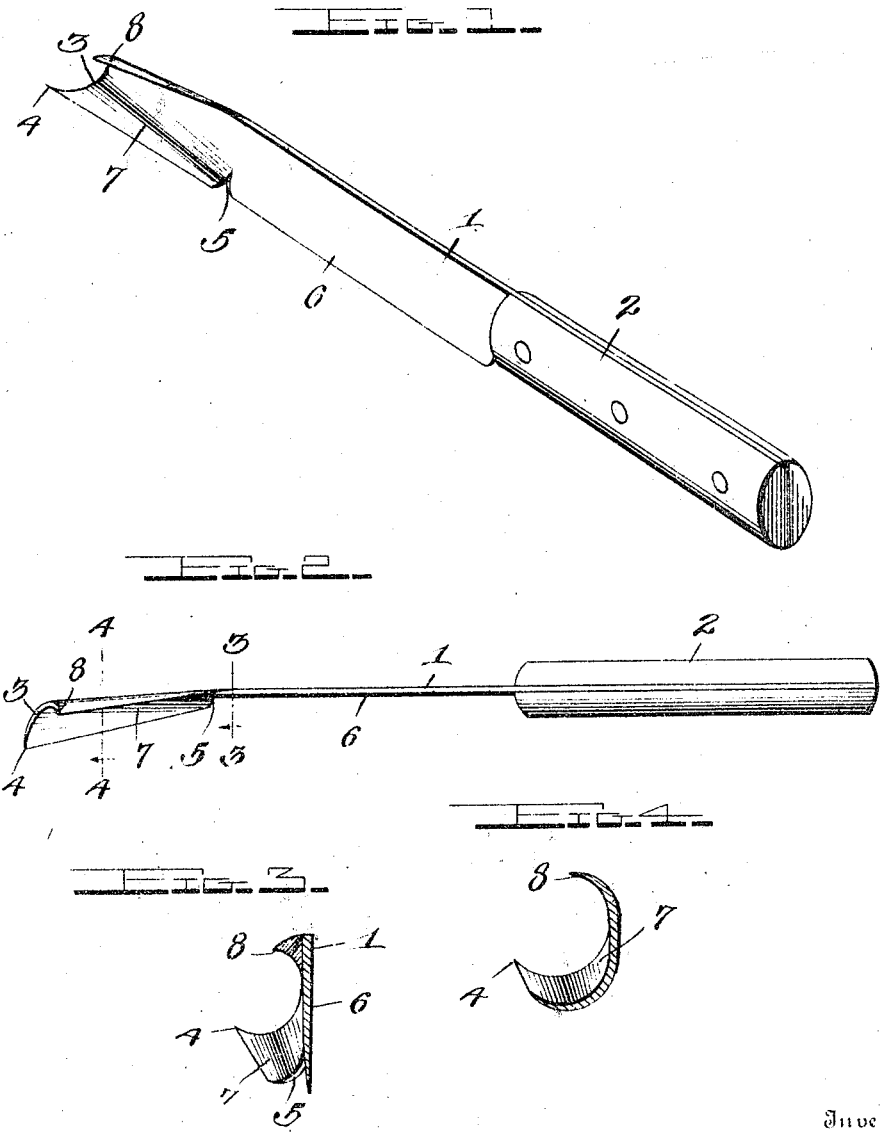

OLIVER D. BROSSIA, OF PERRYSBURG, OHIO.

CULINARY ARTICLE.

1,045,252. Specification of Letters Patent. Patented Nov. 26, 1912.

Application filed June 29, 1912. Serial No. 706,303.

*To all whom it may concern:*

Be it known that I, OLIVER D. BROSSIA, a citizen of the United States, residing at Perrysburg, in the county of Wood and State of Ohio, have invented certain new and useful Improvements in Culinary Articles, of which the following is a specification, reference being had to the accompanying drawings.

This invention comprehends certain new and useful improvements in culinary appliances and relates particularly to the improved construction which may be effectually used as a device for cutting the cores, paring or slicing vegetables and fruits.

The primary object of the present invention is to so construct an ordinary knife blade that the same may be used to perform the above named functions, and which consists of the necessary requirements of simplicity, durability and cheapness in the cost of manufacture.

With the above and other objects in view, this invention consists of the novel details of construction, combination, formation and arrangement of parts as will be hereinafter more fully described, claimed and particularly pointed out in the appended drawings, in which—

Figure 1 is a perspective view of the knife constructed in accordance with my invention. Fig. 2 is a top plan view of the same. Fig. 3 is a section taken on the line 3—3 of Fig. 2, and Fig. 4 is a detail section taken on the line 4—4 of Fig. 2.

Referring now more particularly to the drawings wherein corresponding and like parts are referred to in the following specification and indicated in the accompanying drawings by like numerals, the numeral 1 indicates the blade of an ordinary culinary knife having secured at one end thereof a handle 2 in any well known or preferred manner. The blade 1 of the knife is constructed of the usual continuous piece of flat steel having an inclined forward edge 3 which tapers to a point at the lower edge of the knife, as at 4. The inclined edge of the knife as well as the lower edge thereof, are sharpened in the usual manner for a purpose which will be hereinafter described.

In forming an ordinary knife blade as before described so that it may be used as a corer and parer and at the same time to be used for slicing vegetables and fruit, I form within the lower cutting edge of the blade, a V-shaped notch 5 which divides the knife into two sections. The larger section of the knife, indicated by the numeral 6, may be used for slicing fruit or vegetables in the usual manner, and the opposite or shorter section, indicated by the numeral 7, is so constructed that the same may be used for paring and coring fruit or vegetables. The lower edge of the shorter section 7 is curved, as shown, and increases in curvature toward the outer extremity thereof, while the upper edge thereof, indicated by the numeral 8, is also curved and increases in curvature toward the outer extremity thereof, so that the extremity of the knife blade will be substantially semi-circular in cross section, as more clearly illustrated in Figs. 3 and 4 of the drawing.

It is obvious from this construction that the section 6 of the knife blade may be used for slicing vegetables or fruit in the usual manner, and the outer curved section may be used for cutting the cores of apples and for paring the same or like fruits or vegetables. The pointed extension, indicated by the numeral 4, of the blade is for the purpose of cutting out the stems or other parts of vegetables that are to be discarded, the outer edge of this portion of the blade enabling this cutting out portion to be performed very expeditiously. The shorter section of the blade is also adapted to be used for paring purposes as the lower sharpened edge is used to cut into and lift the edge of the peel, whereupon the free edge of the peel is clamped between the thumb and the curved portion of the blade and then pulled or peeled off.

It is obvious from the foregoing description taken in connection with the accompanying drawings that the practical use of this invention is apparent, and it is further obvious that a knife blade when constructed in accordance with my invention greatly reduces the present cost of manufacture of such articles.

What I claim is:—

The herein described article of culinary, comprising a flat blade having a lower cutting edge, the lower edge thereof being of greater length than the opposite edge thereof thereby forming an inclined outer end, the lower cutting edge of the blade having a V-shaped notch formed therein dividing the same into two sections of different lengths, the upper end of the smaller section being provided with a cutting edge, the said smaller section being curved transversely and increasing in curvature toward the outer extremity thereof, the said blade having the chords of its curves converging to the lower outer end of the smaller section, the outer extremity of said blade being substantially semicircular in cross-section, and the outer extremity of the lower cutting edge terminating in a point, substantially as and for the purpose specified.

In testimony whereof I hereunto affix my signature in the presence of two witnesses.

OLIVER D. BROSSIA.

Witnesses:
ALFRED G. DIBERT,
E. O. TIPPIN.